US 6,722,136 B2

(12) United States Patent
Daggett

(10) Patent No.: US 6,722,136 B2
(45) Date of Patent: Apr. 20, 2004

(54) AIRCRAFT ENGINE WATER MISTING INTER-COOLER

(75) Inventor: David L. Daggett, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 86 days.

(21) Appl. No.: 10/060,632

(22) Filed: Jan. 30, 2002

(65) Prior Publication Data

US 2003/0140634 A1 Jul. 31, 2003

(51) Int. Cl.[7] .................................................. F02G 3/30
(52) U.S. Cl. ............................ 60/775; 60/39.3; 60/39.5
(58) Field of Search ........................ 60/775, 39.3, 39.5

(56) References Cited

U.S. PATENT DOCUMENTS

| 3,842,597 | A | 10/1974 | Ehrich ...................... 60/226 R |
| 6,012,279 | A | 1/2000 | Hines ........................ 60/39.05 |
| 6,470,667 | B1 * | 10/2002 | Payling et al. ................ 60/39.3 |
| 6,470,668 | B2 * | 10/2002 | Payling et al. ................ 60/39.3 |
| 6,484,508 | B2 * | 11/2002 | Rocklin et al. ................ 60/775 |

OTHER PUBLICATIONS

Article Entitled "Gas Turbine System Promises Powr At Lower Rates", L. Johnson & P. Thompson; www.energypubs.com/issues/html/we9904–007.html (Nov. 29, 2001).

* cited by examiner

Primary Examiner—Justine R. Yu
Assistant Examiner—William H. Rodriguez
(74) Attorney, Agent, or Firm—Harness Dickey & Pierce P.L.C.

(57) ABSTRACT

A turbojet engine and a method for its operation which reduces NOx emissions, improves engine thermal efficiency, increases thrust and helps prevent engine performance deterioration. The turbojet engine includes two series of water injection nozzles which inject an atomized water stream into the compressor of the turbojet engine prior to the low pressure portion of the compressor and the high pressure portion of the compressor. The water injection nozzles that provide the atomized water stream to the low pressure portion of the compressor may be selectively disabled to inhibit water from being fed into the low pressure portion of the compressor based upon various criteria, such as the current atmospheric conditions.

16 Claims, 2 Drawing Sheets

AIRCRAFT ENGINE WATER MISTING INTER-COOLER

FIELD OF THE INVENTION

The invention generally relates to turbojet engines and more particularly to a turbojet engine having multiple series of water injection nozzles for injecting streams of atomized water into the airflows entering both a low pressure compressor and a high pressure compressor to reduce NOx emissions, increase thrust and prevent engine performance deterioration.

BACKGROUND OF THE INVENTION

The focus of point-source emissions regulations has expanded relatively recently from automotive vehicles and electric power generating plants to include almost every device that employs fossil fuel to generate power. These ever more stringent regulations necessitate that both aircraft and turbojet engine manufacturers continually strive to improve the efficiency of their products, as well as decrease their emissions generating capacity. As those skilled in the art will readily understand, however, these two objectives frequently pull relevant design criteria in opposite directions. For example, higher combustion temperatures are generally viewed as assisting a turbojet engine to achieve a relatively high degree of efficiency. High combustion temperatures, however, typically increase the amount of NOx that is produced during combustion by a significant degree.

Previous attempts to increase efficiency and reduce emissions in turbojet engines include ground-based engine wash systems and engine combustor water injection. The ground-based engine wash systems are employed to clean the rotating components of a turbojet engine to thereby obtain a 0.5% to 1.0% increase in fuel efficiency. Such systems, however, are costly to procure and operate, given that an expensive water recovery system is likely needed for capturing the wash effluent and that such systems take aircraft out of service while the turbojet engines are being cleaned.

The older engine combustor water injection systems, which inject water directly into the combustion chamber of a turbojet engine, are known to improve the thrust of a turbojet engine, but typically suffer from draw backs such as an increase in maintenance costs, increased smoke and reduced thermal efficiency.

SUMMARY OF THE INVENTION

In one preferred form, the present invention provides a method for reducing NOx emissions while simultaneously increasing the thrust and thermal efficiency on hot days from a turbojet engine. The turbojet engine has a high pressure compressor axially spaced between a low pressure compressor and a turbine. The method includes the steps of: providing a series of water injection nozzles between the low pressure compressor and the high pressure compressor; operating the turbojet engine to produce thrust; operating the series of water injection nozzles to input a finely atomized stream into the high pressure compressor; wherein the stream is comprised of atomized water.

In another preferred form, the present invention provides turbojet engine having an air intake, a compressor, a first series of water injection nozzles and a second series of water injection nozzles. The compressor is coupled to the air intake and receives an inlet flow of air therefrom. The compressor includes a low pressure portion, which compresses the inlet flow, and a high pressure portion, which receives and further compresses the airflow from the low pressure portion. The first series of water injection nozzles is coupled to the air intake and injects a first stream of finely atomized water into the airflow entering the low pressure portion of the compressor. The second series of water injection nozzles is configured to inject a second stream of finely atomized water into the airflow entering the high pressure portion of the compressor.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
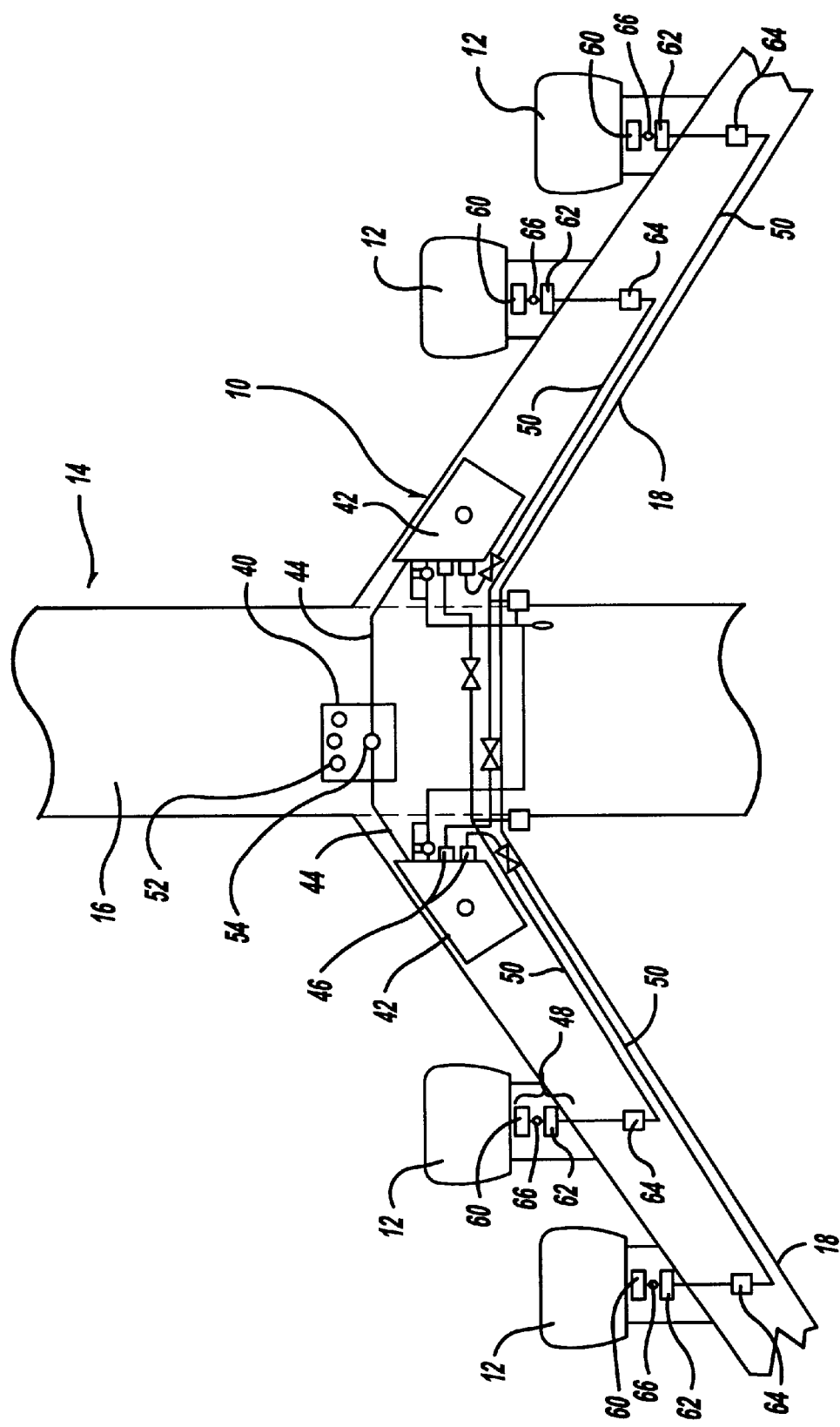
FIG. 1 is a schematic illustration of an aircraft having a water misting intercooler system constructed in accordance with the teachings of the present invention.
Figure 2:
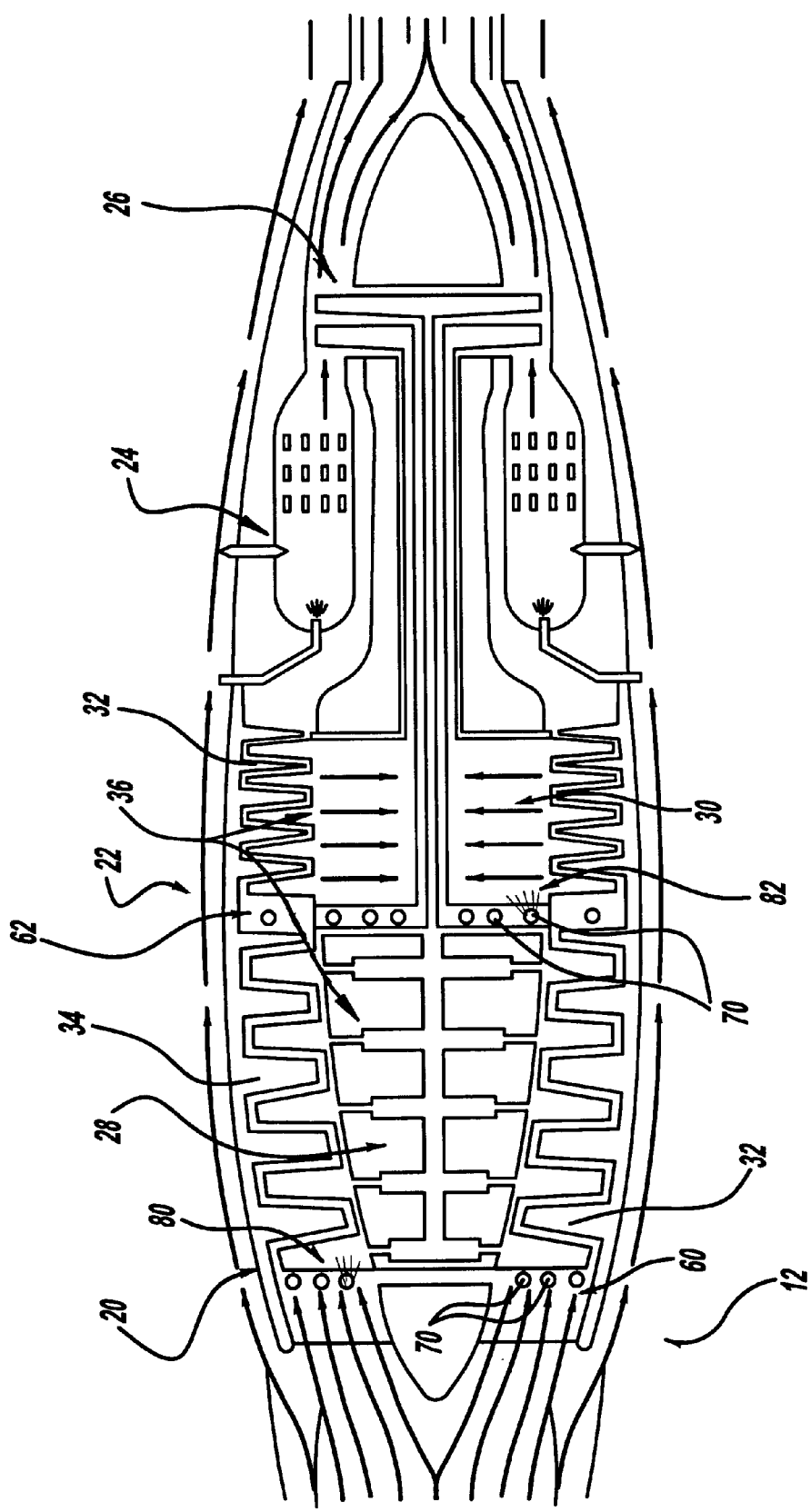
FIG. 2 is a schematic illustration of a portion of the aircraft of FIG. 1 illustrating one of the turbojet engines and the nozzles of the water misting intercooler system in greater detail.

With reference to FIGS. 1 and 2 of the drawings, a water misting intercooler system 10 constructed in accordance with the teachings of the present invention is illustrated in operative association with the turbojet engines 12 of an exemplary aircraft 14. The aircraft 14 is illustrated to conventionally include a fuselage 16 and a pair of wing assemblies 18 that are attached to the opposite sides of the fuselage 16. In the particular embodiment illustrated, two of the turbojet engines 12 are conventionally mounted to each wing assembly 18 and the water misting intercooler system 10 is coupled to each of the turbojet engines 12. While the water misting intercooler system 10 of the present invention is illustrated in conjunction with an aircraft having four turbojet engines, those skilled in the art will understand that the water misting intercooler system 10 of the present invention may be used in conjunction with aircraft of various different configurations and having any number of turbojet engines 12. Furthermore, the water misting intercooler system 10 of the present invention need not be used in conjunction with each of an aircraft's turbojet engines.

With specific reference to FIG. 1, each turbojet engine 12 is illustrated to include an intake 20, a compressor 22, a combustor 24, and a turbine 26. As the construction and operation of turbojet engines is generally well known in the art, the turbojet engine need not be discussed in exhaustive detail. Briefly, an intake airflow entering the turbojet engine through the intake 20 is directed to the compressor 22. The compressor 22 is segregated into two portions, a first, low pressure portion 28 and a second, high pressure portion 30. Each of the low and high pressure portions 28 and 30 of the compressor 22 include a plurality of axially spaced apart stators 32 that are fixedly coupled to the housing 34 of the compressor 22, and a plurality of rotors 36 that are supported for rotation in the housing 34. The rotors 36 are staggered axially such that a stator 32 is disposed between each adjacent pair of rotors 36. Interaction between the rotors 36 and the stators 32 of the low pressure portion 28 of the compressor 22 applies work to compress the intake airflow, while interaction between the rotors 36 and the stators 32 of the high pressure portion 30 of the compressor 22 apply work to compress the airflow exiting the low pressure portion 28. Air exiting the compressor 22 enters the combustor 24 where fuel is mixed with the airflow and thereafter burned to produce a high velocity exhaust stream that is directed into the turbine 26 which is used to power the rotors 36 of the low and high pressure portions 28 and 30 of the compressor 22.

In FIG. 2, the water misting intercooler system 10 is illustrated to include a remote service panel 40, a pair of water tanks 42, a pair of tank fill conduits 44 for coupling in fluid connection water tanks 42 and the remote service panel 40, a plurality of high pressure pumps 46 each of which being in fluid connection with one of the water tanks 42, a plurality of nozzle assemblies 48 each of which being associated with a different one of the turbojet engines 12, and plurality of water supply conduits 50, each of which coupling in fluid connection one of the high pressure pumps 46 and one of the nozzle assemblies 48.

The remote service panel 40 is mounted to the fuselage 16 and provides maintenance technicians with a convenient means for filling the water tanks 42. The remote service panel 40 includes a fill connection 52 and a tank fill valve 54. The tank fill valve 54 is illustrated to be a two-way, three position valve; two of the valve positions permit water to be directed from the fill connection 52 and associated one of the tank fill conduits 44, while the other valve position inhibits fluid flow between the fill connection 52 and both of the tank fill conduits 44. Preferably, de-mineralized water, such as that which is provided through reverse osmosis filtering, is utilized in the water misting intercooler system 10.

In the particular example provided, each of the water tanks 42 is illustrated to have a capacity of about 150 gallons and be mounted within an associated wing assembly 18 offset somewhat from the fuselage 16. Each high pressure pump 46 is mounted to one of the water tanks 42 and supplies water under high pressure to one of the nozzle assemblies 48 via a water supply conduit 50. Each nozzle assembly 48 includes a first series of nozzles 60, a second series of nozzles 62, a shutoff valve 64 and a first valve 66. The first series of nozzles 60 includes a plurality of water injection nozzles 60 that are coupled to the air intake 20 and oriented so as to inject a first stream 80 of atomized water into the airflow entering the low pressure portion 28 of the compressor 22. The second series of nozzles 62 includes a plurality of water injection nozzles 70 that are coupled to the compressor 22 and oriented to inject a second stream 82 of atomized water into the airflow entering the high pressure portion 30 of the compressor 22. The shutoff valve 64 is coupled to the water supply conduit 50 and is selectively operable between a closed condition, for inhibiting the flow of water to the first valve 66 and the second series of nozzles 62, and an open condition for permitting water to flow from the water supply conduit 50 to the first valve 66 and the second series of nozzles 62. The first valve 66 is coupled to the first series of nozzles 60 and is operable between a closed condition, for inhibiting the flow of water to the first series of nozzles 60, and an open condition, for permitting water to flow to the first series of nozzles 60.

The water misting intercooler system 10 is operable in an unenergized mode, a first energized mode, and a second energized mode. When operated in the unenergized mode, the shutoff and first valves 64 and 66 in each nozzle assembly 48 are positioned in the closed position to inhibit the flow of water to the water injection nozzles 70. In this configuration, the turbojet engine 12 functions conventionally.

When the water misting intercooler system 10 is operated in the first energized mode, both the shutoff and first valves 64 and 66 of each nozzle assembly 48 are positioned in the opened position to permit water to flow to the water injection nozzles 70 in each of the first and second series of nozzles 60 and 62. The water in the stream that is produced by the first series of nozzles 60 is atomized such that the droplets that make up the stream have a size of about 20 microns or less. Similarly, the water in the stream that is produced by the second series of nozzles 62 is atomized such that the droplets that make up the stream have a size of about 20 microns or less. In contrast to the operation of the first series of nozzles 60, however, atomization of water from the second series of nozzles 62 is assisted by high pressure air from the high pressure portion 30 of the compressor 22. Such air may be directed directly from a desired stage of the high pressure portion 30 of the compressor 22, or may be a flow of bleed air that is redirected from the compressor 22 into the nozzle assemblies 48.

Operation of the water misting intercooler system 10 in the first energized mode advantageously cleans the low and high pressure portions 28 and 30 of the compressor 22, increases the thrust of the turbojet engine 12, and reduces the temperature of the high pressure compressor 30 to thereby reduce NOx emissions in the combustor 24. The water misting intercooler system 10 is particularly useful to reduce the emissions of an aircraft during takeoff, since higher levels of thrust are typically needed during takeoff. Furthermore, since atomized water is being input to the compressor 22, rather than the combustor 24, the water misting intercooler system 10 does not cause the turbojet engine 12 to generate smoke as seen in previous water injection systems wherein water was injected directly into the combustion chamber 24. Furthermore since water is introduced into the compressor 22, the water acts as a heat sink to reduce compressor inlet temperatures and improve compressor efficiency as opposed to reducing engine thermal efficiency by injecting water directly into the combustor 24.

As those skilled in the art will understand, the input of a stream of atomized water into the low pressure portion 28 of the compressor 22 may not be desirable under all circumstances, such as when atmospheric conditions would promote freezing. In such situations, the water misting intercooler system 10 may be operated in the second energized mode, wherein the shutoff valve 64 of each nozzle assembly 48 is positioned in the opened position and the first valve 66 of each nozzle assembly 48 is positioned in the closed position to permit water to flow to the water injection nozzles 70 in only the second series of nozzles 62.

Operation of the water misting intercooler system 10 in the second energized mode advantageously cleans the high pressure portion 30 of the compressor 22, increases the thrust of the turbojet engine 12, and reduces the compressor exit temperature of the high pressure compressor 30 to thereby reduce NOx emissions in the combustor 24. Thrust and NOx emissions, however, are not affected to the same degree as when the water misting intercooler system 10 is operated in the first energized mode.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A method for reducing NOx emissions, increasing the thrust, and improving engine thermal efficiency from a turbojet engine, the turbojet engine having a high pressure compressor axially spaced between a low pressure compressor and a turbine, the method comprising the steps of:
   providing a first series of water injection nozzles prior to the low pressure compressor;
   providing a second series of water injection nozzles between the low pressure compressor and the high pressure compressor;
   operating the turbojet engine to produce thrust;
   selectively operating the first series of water injection nozzles to input a first mist stream into the low pressure compressor; and
   operating the second series of water injection nozzles to input a second mist stream into the high pressure compressor;
   wherein each of the first and second mist streams is comprised of atomized water;
   wherein selective operation of the first series of water injection nozzles is at least partially based on the atmospheric condition in which the turbojet engine is operating.

2. The method of claim 1, wherein the atomized water has a size that is less than about 20 microns.

3. The method of claim 1, wherein atomization of at least one of the first and second mist streams is assisted by a high pressure bleed air flow.

4. The method of claim 1, wherein the first series of water injection nozzles are not employed to generate the first mist stream when the atmospheric condition in which the turbojet engine is operating would facilitate freezing.

5. The method of claim 4, wherein the atomized water has a size that is less than about 20 microns.

6. The method of claim 4, wherein atomization of at least one of the first and second mist streams is assisted by a high pressure bleed air flow.

7. A method for reducing NOx emissions and increasing the thrust from a turbojet engine, the turbojet engine including a low pressure compressor, a high pressure compressor and a combustor, the high pressure compressor being axially spaced between the low pressure compressor and the combustor, the methodology comprising the steps of:
   determining whether an atmospheric condition in which the turbojet engine is operating facilitates freezing of water mist;
   if the atmospheric condition facilitates freezing of water mist, injecting an atomized water stream only into an airflow entering the high pressure compressor; and
   otherwise, injecting the atomized water stream into an airflow entering the low pressure compressor and the airflow entering the high pressure compressor.

8. The method of claim 7, wherein atomization of at least one of the atomized water streams is assisted by a high pressure bleed air flow.

9. The method of claim 7, wherein the water mist that makes up each atomized water stream has a size that is less than about 20 microns.

10. A turbojet engine comprising:
    an air intake;
    a compressor coupled to the air intake and receiving an inlet flow of air therefrom, the compressor including a low pressure portion and a high pressure portion, the low pressure portion compressing the inlet flow, the high pressure portion receiving and further compressing the airflow from the low pressure portion;
    a first series of water injection nozzles coupled to one of the air intake and the compressor, the first series of water injection nozzles being configured to inject a first stream of atomized water into the airflow entering the low pressure portion of the compressor;
    a second series of water injection nozzles coupled to the compressor, the second series of water injection nozzles being configured to inject a second stream of atomized water into the airflow entering the high pressure portion of the compressor; and
    means for controlling the first and second series of water injection nozzles, said controlling means being operable in a de-energized mode, wherein neither of the first and second series of water injection nozzles inject atomized water in a first energized mode, wherein both of the first and second series of water injection nozzles inject atomized water, and a second energized mode, wherein only the second set of water injection nozzles injects atomized water.

11. The turbojet engine of claim 10, wherein a high pressure bleed airflow is directed into the second series of water injection nozzles to aid in atomizing the water that forms the second stream of atomized water.

12. The turbojet engine of claim 10, the water mist that makes up each of the first and second streams of atomized water has a size that is less than about 20 microns.

13. A method for operating an aircraft with a turbojet engine, the turbojet engine including a high pressure compressor positioned between a low pressure compressor and a turbine, the method comprising the steps of:
    providing a first series of water injection nozzles prior to the low pressure compressor;
    providing a second series of water injection nozzles between the low pressure compressor and the high pressure compressor;
    operating the turbojet engine to produce thrust to propel the aircraft;
    intermittently operating the first and second series of water injection nozzles at one or more discrete occasions during the operation of the aircraft, the one or more discrete occasions including take-off.

14. The method of claim 13, wherein the first and second series of water injection nozzles are selectively operated at least partially based on an atmospheric condition in which the aircraft is operating.

15. The method of claim 14, wherein the first series of water injection nozzles are not employed to generate a first mist stream into the low pressure compressor when the atmospheric condition in which the aircraft is operating would facilitate freezing.

16. The method of claim 15, wherein the second series of water injection nozzles are employed at each discrete occasion to input a second mist stream into the high pressure compressor.

* * * * *